April 28, 1931.  E. GOLDBERG  1,802,598

FILM MAGAZINE

Filed Aug. 27, 1929

Inventor
Emanuel Goldberg
By his Attorney
George C. Heinicke

Patented Apr. 28, 1931

1,802,598

UNITED STATES PATENT OFFICE

EMANUEL GOLDBERG, OF DRESDEN-LOSCHWITZ, GERMANY, ASSIGNOR TO ZEISS IKON AKTIENGESELLSCHAFT, OF DRESDEN, GERMANY

FILM MAGAZINE

Application filed August 27, 1929, Serial No. 388,678, and in Germany October 15, 1928.

This invention relates to improvements in film roll holders or magazines for holding flexible films, particularly for photographic or cinematographic apparatus, and it is the principal object of my invention to equip such magazines with means for effectively preventing a premature and automatic unwinding and winding up of the film under the influence of shocks to which the apparatus is subjected during transportation or caused by the tendency of the film to unwind under its inherent spirally acting force, causing the unwound parts of the film to engage the inner circular wall of the magazine and thus acting as a band brake during the intended unwinding of the film band in use.

Another object of my invention is the provision of a film magazine equipped with a simple and inexpensive device for keeping the film constantly and properly wound up within the magazine, yet durable and efficient in operation.

A further object of my invention is the provision of means on the core of the film spool co-operating with means on the cover for the film magazine to effectively lock the spool and film during transportation, yet allowing a free unwinding of the film during exposure.

A still further object of my invention is the provision of a core for the film-band spool adapted for axial movement within a sleeve independently from the film band wound upon the sleeve, while the spool is locked against rotation by the engagement of a projection on the film magazine cover in a depression in the end of the spool core.

It is also an object of my invention to provide a film spool core formed by two inverted telescoping vessels closed at their ends, whereby the movement of the inner sleeve is limited by an abutment on the outer sleeve, while the inner sleeve has formed a depression in its end adapted to receive a projection of the film magazine cover.

These and other objects of my invention will become more fully apparent as the description thereof proceeds, and will then be specifically defined in the appended claims.

In the accompanying drawing, forming a material part of this disclosure:

Figure 1:
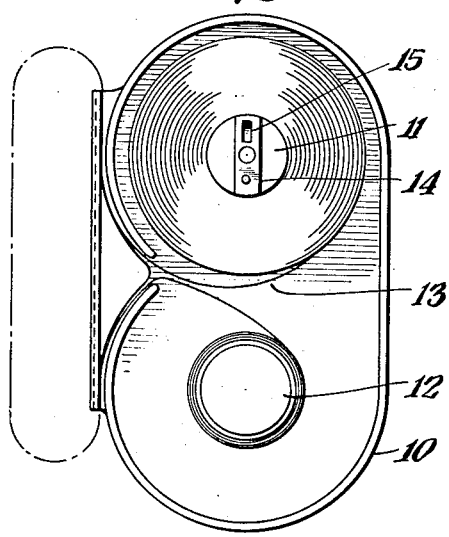
Fig. 1 is a side elevation of a film magazine constructed according to my invention, open.
Figure 2:
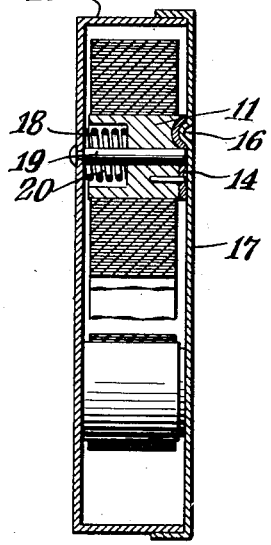
Fig. 2 is a longitudinal section therethrough.

As illustrated in Figures 1 and 2, the film magazine 10 contains the customary film spools or cores 11 and 12 respectively for unwinding or winding up of the film 13 respectively.

The end face of spool 11 has provided thereon a diagonally arranged strip 14 having a longitudinal slot 15. A projection 16 formed by a depression in the cover 17 of the magazine is adapted to engage slot 15 under the action of a spring 18 wound about the axis 19 within a chamber 20 of the core 11.

In operation the film will be prevented from unwinding under the influence of shocks during the transportation of the film and its tendency to unwind under the inherent spiral acting force, by the engagement of the projection 16 in slot 15 of core 11 under the action of spring 18.

Figure 3:
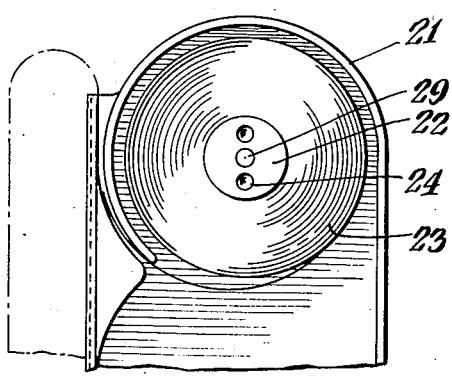
Fig. 3 is a fragmentary side elevation of a modified form of my invention.
Figure 4:
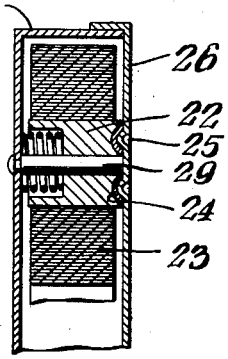
Fig. 4 is a longitudinal section therethrough.

In the modified form of my invention illustrated in Figures 3 and 4, the upper part of the film magazine is designated 21 and contains the spool 22 about which the film 23 is wound. In this form the end of the spool core has semispherical depressions 24 formed therein adapted to be engaged by corresponding projections 25 formed in the core 26 of the magazine.

In this form also the core or spool 22 has a chamber 27 formed therein in which a spring 28 is wound about the core axis 29.

The operation in this form is the same as described with respect to the form illustrated in Figures 1 and 2, the spring 28 will hold projection 25 at all times in engagement with the depression 24, so that the film band will be kept in its wound position and cannot automatically unwind under the action of shocks or the like experienced during the transport of the magazine.

It will be understood that I have shown and described some of the forms of my invention as examples of the many possible ways to practically construct the same, and that I may make such changes in the general arrangement and in the construction of the minor details thereof without departure from the spirit of my invention and the principles involved.

Having thus described my invention, what I claim as new and desire to secure by Letters Patent is:

1. Device for preventing accidental and self-unwinding of flexible films in film magazines comprising a spool core, a perforated strip thereon, a cover for said magazine having an inner projection formed thereon by a depression of the material, said projection adapted to engage the perforation in said strip for locking the spool against unintended rotation to prevent automatic unwinding of the film roll.

2. Device for preventing accidental unrolling of a film from its spool within a film magazine during transportation comprising a spool core, a slotted radially disposed strip at the end of said core, a cover for said magazine, and a projection formed in said cover by a depression of its material, adapted to engage the slot in said core strip.

3. A device for preventing accidental unrolling of a film from its spool by the influence of its inherent spirally acting force under shocks during transportation of the film magazine comprising a core, a means on said core constituting a female member, a cover, a male member formed on said cover adapted to engage said female member to prevent accidental relative movements between cover and spool.

Signed at Dresden, Germany, in the county of Saxony and State of Germany this 31st day of July A. D. 1929.

EMANUEL GOLDBERG.